US012527715B2

(12) United States Patent
Wang

(10) Patent No.: US 12,527,715 B2
(45) Date of Patent: Jan. 20, 2026

(54) SEXUAL STIMULATION DEVICE

(71) Applicant: Dongguan Hongxiang Electronic Technology Co., Ltd., Guangdong (CN)

(72) Inventor: Qinduo Wang, Guangdong (CN)

(73) Assignee: Dongguan Hongxiang Electronic Technology Co., Ltd., Dongguan (CN)

( * ) Notice: Subject to any disclaimer, the term of this patent is extended or adjusted under 35 U.S.C. 154(b) by 0 days.

(21) Appl. No.: 19/057,962

(22) Filed: Feb. 19, 2025

(65) Prior Publication Data

US 2025/0186298 A1 Jun. 12, 2025

(30) Foreign Application Priority Data

May 11, 2024 (CN) ......................... 202421028501.6

(51) Int. Cl.
*A61H 19/00* (2006.01)
*A61H 23/02* (2006.01)

(52) U.S. Cl.
CPC ............. *A61H 19/34* (2013.01); *A61H 19/50* (2013.01); *A61H 23/0254* (2013.01); *A61H 2201/0153* (2013.01); *A61H 2201/1215* (2013.01); *A61H 2201/165* (2013.01)

(58) Field of Classification Search
CPC ........ A61H 19/00; A61H 19/30; A61H 19/32; A61H 19/34; A61H 19/50; A61H 23/0254
See application file for complete search history.

(56) References Cited

U.S. PATENT DOCUMENTS

| | | | | |
|---|---|---|---|---|
| 2010/0010292 A1* | 1/2010 | Talbot | ................ | A61H 23/0263 600/38 |
| 2017/0172841 A1* | 6/2017 | Sindelar | ................. | A61H 23/02 |
| 2020/0268595 A1* | 8/2020 | Lewis | ................ | A61H 23/0263 |
| 2022/0296459 A1* | 9/2022 | Jin | ......................... | A61H 19/34 |

FOREIGN PATENT DOCUMENTS

| | | | |
|---|---|---|---|
| ES | 2581848 | * 9/2021 | ............. A61H 19/34 |

* cited by examiner

*Primary Examiner* — Carrie R Dorna

(57) ABSTRACT

A sexual stimulation device includes an outer shell being configured with a flexible massage member that has a central axis, a driving mechanism mounted inside the outer shell and a position member connected to the outer shell. The driving mechanism includes a driving source and a driving shaft connected to the driving source in a transmission manner. The massage member is connected to the driving shaft to rotate along with the driving shaft, wherein a rotary axis of the massage member is inclined relative to the central axis of the massage member. The position member is connected to the outer shell, and includes at least one ring configured for positioning the massage member onto a human body during use.

20 Claims, 15 Drawing Sheets

SEXUAL STIMULATION DEVICE

CROSS-REFERENCE TO RELATED APPLICATIONS

This application claims priority to Chinese Patent Application No. 202421028501.6, filed on May 11, 2024. The content of the aforementioned application, including any intervening amendments thereto, are incorporated herein by reference.

TECHNICAL FIELD

The present application relates to the technical field of adult products, and in particular to a sexual stimulation device.

BACKGROUND

In recent years, various adult sex products have been developed to help the users to release their sex pressure. Generally, the existing adult sex products use vibration motor(s) to provide high-frequency vibration to stimulate the user's sensitive areas, such as the breast, the genitalia and the like. However, such sex products need to be held by hand during use, otherwise they are easy to fall off, resulting in poor sexual experiences.

SUMMARY

An object of the present application is to provide a sexual stimulation device which can be positioned on the human body, thereby providing better stimulation effects and sexual experiences.

In order to achieve the above object, an embodiment of the present application provides a sexual stimulation device, including:

- an outer shell being configured with a flexible massage member, the massage member having a central axis;
- a driving mechanism mounted inside the outer shell and including a driving source and a driving shaft connected to the driving source in a transmission manner, the massage member being connected to the driving shaft to rotate along with the driving shaft, wherein a rotary axis of the massage member is inclined relative to the central axis of the massage member; and
- a position member connected to the outer shell and including at least one ring configured for positioning the massage member onto a human body during use.

Compared with the prior art, the sexual stimulation device according to embodiments of this application may be positioned onto the human body, especially on the male body, through its position member, which is convenient for users to use. During operation, the massage member may be driven to revolve around the rotary axis to stimulate the sensitive areas of another human body, thereby helping the users reach orgasm quickly.

BRIEF DESCRIPTION OF THE DRAWINGS

In order to illustrate the technical solution in embodiments of the present application more clearly, the following briefly introduces accompanying drawings used in the description of the embodiments. Obviously, the accompanying drawings in the following description are only some embodiments of the present application. Those of ordinary skill in the art can obtain other accompanying drawings from these accompanying drawings without any creative efforts.

DESCRIPTION OF THE EMBODIMENTS

In order to make those skilled in the art better understand the technical solution of the present application, the technical solution in the embodiments of the present application will be clearly and completely described below with reference to accompanying drawings in the embodiments of the present application. Obviously, the embodiments described below are a part of the embodiments of the present application, rather than the entire embodiments. Based on the embodiments of the present application, all other embodiments obtained by those skilled in the art without any creative efforts fall within the protection scope of the present application.

In the description of this application, it should be noted that the terms "center", "up", "down", "left", "right", "vertical", "horizontal", "inside", "outside" and other directional or positional relationships indicated are based on the directional or positional relationships shown in the accompanying drawings, only for the convenience of describing and simplifying the description, and do not indicate or imply that the device or component referred to must have a specific orientation, be constructed and operated in a specific orientation, and therefore cannot be understood as a limitation of this application. In addition, the terms "first", "second", and "third" are only used for descriptive purposes and cannot be understood as indicating or implying relative importance.

In the description of this application, it should be noted that unless otherwise specified and limited, the terms “mount”, “connect”, and “communicate” should be broadly understood. For example, it may be fixed connection, detachable connection, integrated connection, mechanical connection, electrical connection, direct connection, indirect connection through intermediate media, or internal communication between two components. For those skilled in the art, the specific meanings of the above terms in this application may be understood in specific situations.

Technical solutions provided by embodiments of the present application will be described below in combination with the accompanying drawings.

Figure 1:
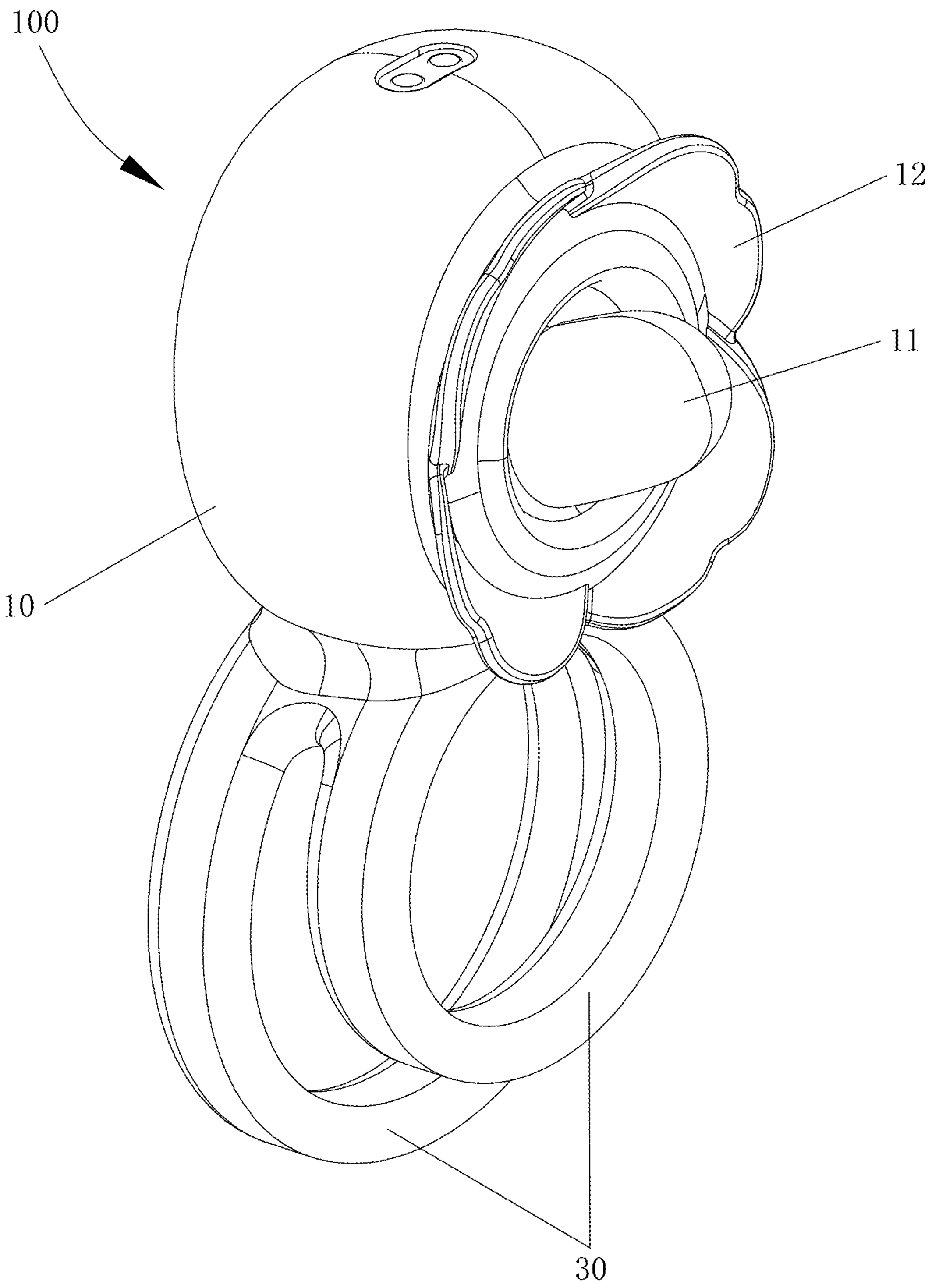
FIG. 1 is an isometric, assembled view of a sexual stimulation device according to a first embodiment of the present application.
Figure 2A:
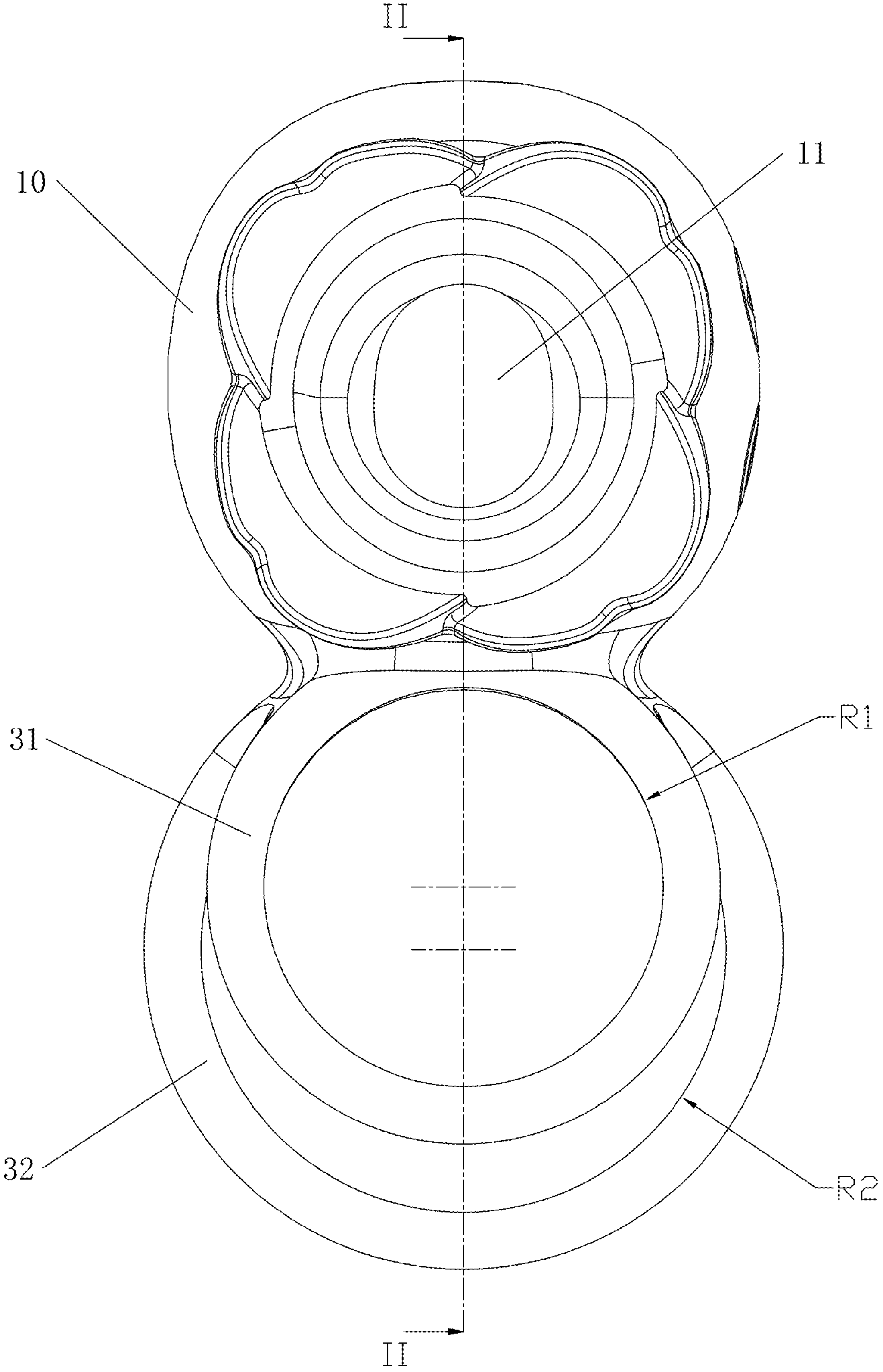
FIG. 2*a* is a front view of the sexual stimulation device of FIG. 1.
Figure 2B:
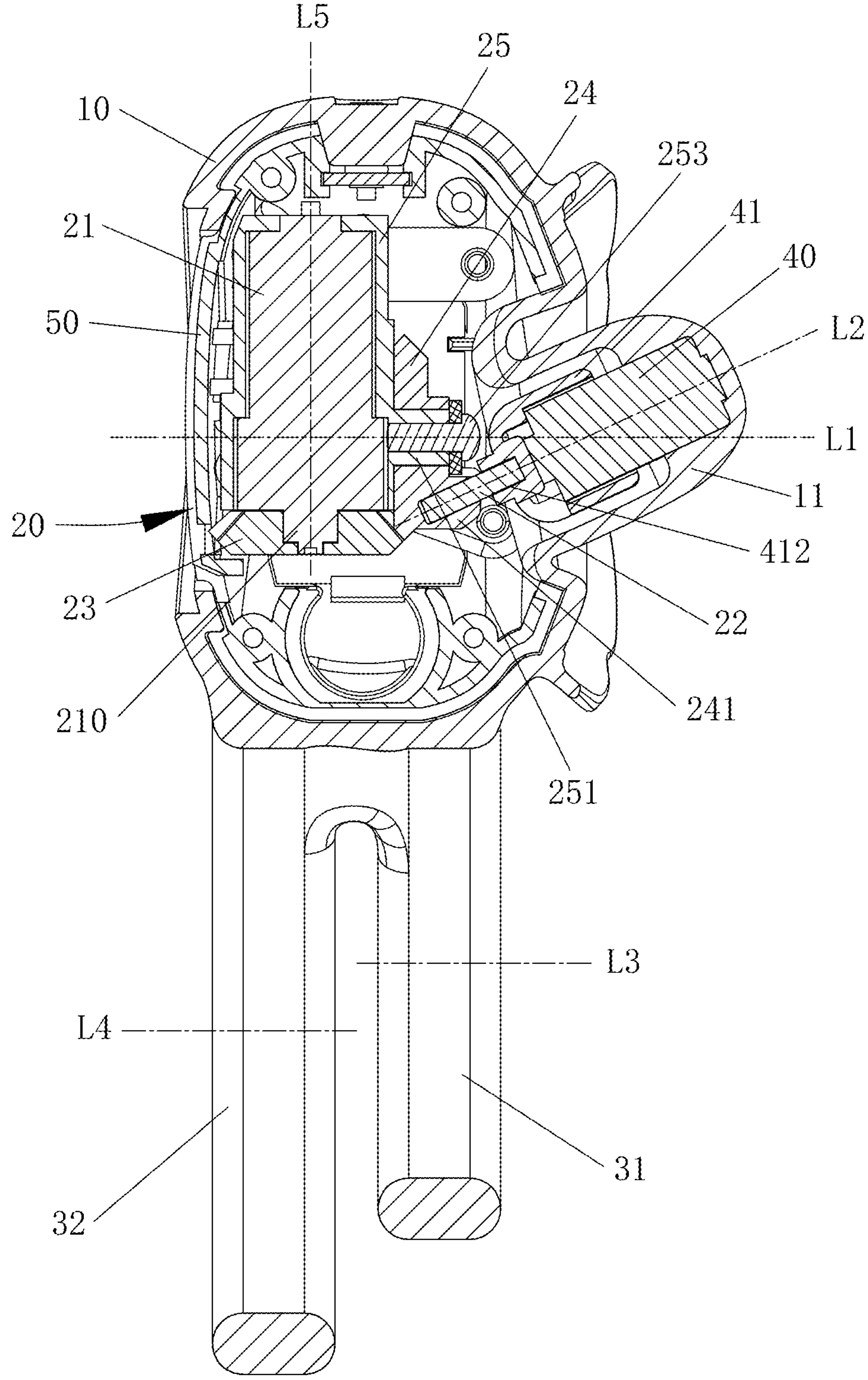
FIG. 2*b* is a cross sectional view of the sexual stimulation device taken along line II-II of FIG. 2*a*.

Referring to FIG. 1 to FIG. 2*b*, a sexual stimulation device according to a first embodiment of the present application is shown. The sexual stimulation device 100 includes an outer shell 10, a driving mechanism 20, and a position member 30. The outer shell 10 includes a massage member 11 made of flexible materials, such as silicone. The driving mechanism 20 is mounted inside the outer shell 10, and configured for driving the massage member 11 to revolve around a rotary axis L1, wherein the rotary axis L1 is inclined relative to a central axis L2 of the massage member 11.

In this embodiment, the driving mechanism 20 includes a driving source 21 and a driving shaft 22 being configured with one end thereof connected to the driving source 21 in a transmission way and another end thereof engaged into the massage member 11. During operation, the driving shaft 22 is driven to rotate about the rotary axis L1. The driving shaft 22 extends along a direction being inclined relative to the rotary axis L1. Preferably, the driving shaft 22 is connected to a central portion of one end of the massage member 11, and the central axis L2 of the massage member 11 is substantially collinear with that of the driving shaft 22.

The position member 30 is made of flexible materials, such as silicone, configured for mounting the device onto the human body. Preferably, the position member 30 is integrally formed with the outer shell 10 as one piece. In this embodiment, the position member 30 is connected to a circumferential wall of the outer shell 10 surrounding the rotary axis L1. In this embodiment, the position member 30 includes two rings 31, 32, which can be assembled onto a part of the human body that is generally column-shaped. For example, the rings 31, 32 may be mounted around a finger of a human hand, man’s penis, and etc.

During use, the sexual stimulation device 100 may be self-positioned onto the human body, especially on the male body, through the rings 31, 32, which is convenient for users to use. The massage member 11 of the sexual stimulation device 100 may be driven to revolve around the rotary axis L1 by the driving source 21 through the driving shaft 22, so as to generate a kneading effect on the human body. When the massage member 11 acts on the sensitive areas, such as the vulva, the breasts, and etc., it produces an effect similar to tongue licking, which can help women reach orgasm quickly.

The massage member 11 may be further equipped with a vibration member 40, such as a vibration motor. In this embodiment, a mounting sleeve 41, which is made of hard materials, such as plastic, metal and etc., is fixed inside the massage member 11 and connected to the driving shaft 22. A central axis of the mounting sleeve 40 is inclined relative to the rotary axis L1 and generally collinear with the central axis L2 of the massage member 11/driving shaft 22. The vibration member 40 is partly accommodated inside the mounting sleeve 41 and partly supported by an inner wall of the massage member 11.

In this embodiment, one end of the mounting sleeve 41 is provided with a shaft seat 410, and a shaft hole 412 is defined in a central portion of the shaft seat 410. The another end of the driving shaft 22 is engaged into the shaft hole 412. Therefore, when the driving shaft 22 revolves around the rotary axis L1, the mounting sleeve 41, the vibration member 40 and the massage member 11 together will revolve around the rotary axis L1 along with the driving shaft 22. That is, the massage member 11 is driven to rotate and vibrate simultaneously, achieving better stimulation effects.

Figure 3:
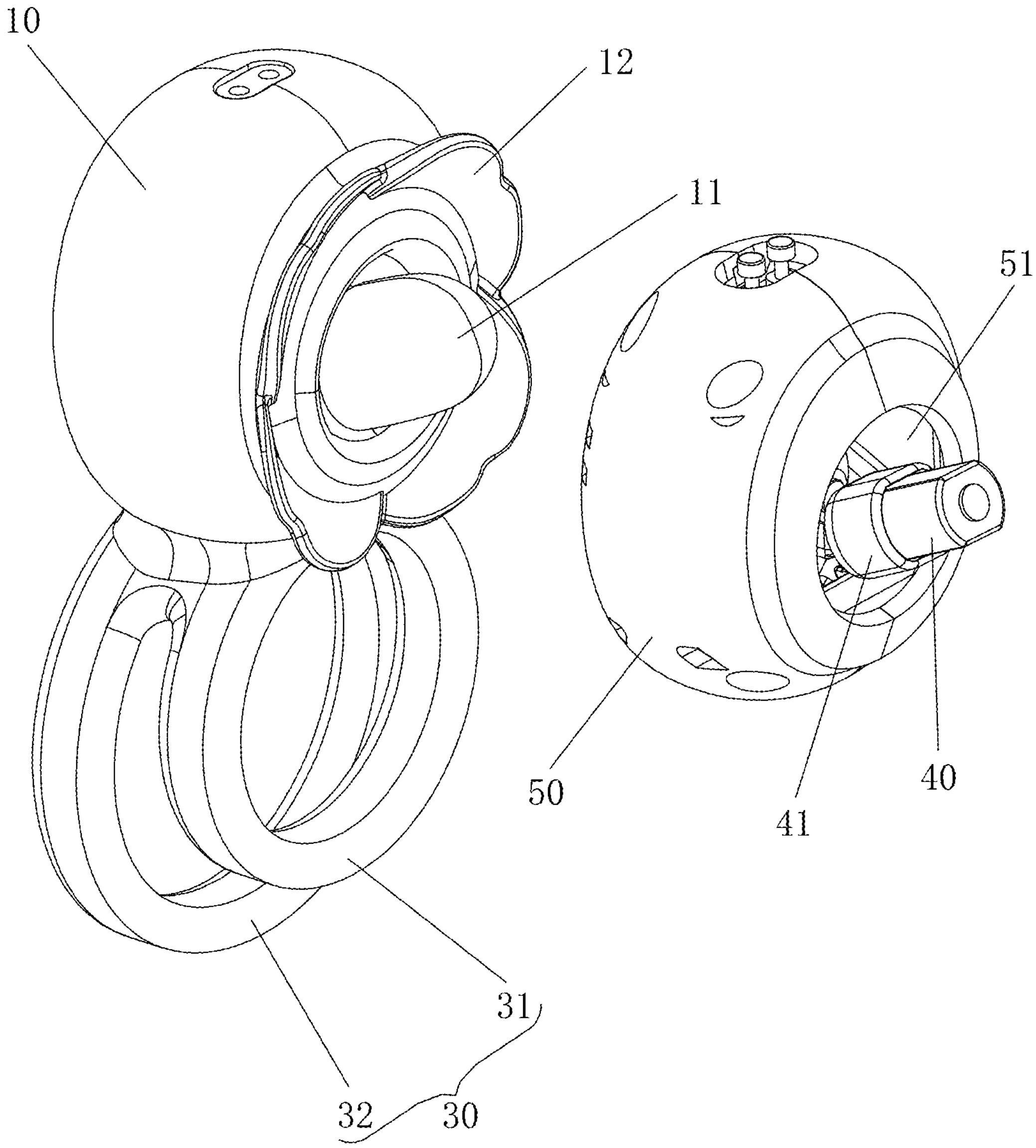
FIG. 3 is an exploded view of the sexual stimulation device of FIG. 1.

Referring to FIG. 2*b* and FIG. 3, in this embodiment, the outer shell 10 is generally configured as a drum. The massage member 11 is generally configured as a hollow rod and provided at a central portion of an axial end of the outer shell 10. Optionally, several petal-shaped flanges 12 are arranged around the massage member 11. The massage member 11 and the flanges 12 in whole are configured as a flower, which not only makes the overall appearance of the sexual stimulation device 100 more beautiful, but also stimulates a part of the human body around the massage member 11, further improving the stimulation effects.

Specifically, the position member 30 includes a first ring 31 and a second ring 32 that are arranged in parallel. As shown in FIG. 2*b*, a central axis L3 of the first ring 31 and a central axis L4 of the second ring 32 are parallel to each other, and both are parallel to the rotary axis L1. The first ring 31 is close to the axial end of outer shell 10 configured with the massage member 11, and the second ring 32 is close to another axial end of outer shell 10 without the massage member 11. As shown in FIG. 2*a*, an inner diameter R1 of the first ring 31 is different from, such as less than, an inner diameter R2 of the second ring 32.

Referring to FIG. 2*b* to FIG. 4, the sexual stimulation device 100 further includes an inner shell 50, which is accommodated inside the outer shell 10 for support the driving mechanism 20 and the outer shell 10. The inner shell 50 is shaped to match the outer shell 10, that is, the outer contour of the inner shell 50 is generally circular. Preferably, the hardness of the inner shell 40 is greater than that of the outer shell 10. For example, the inner shell 40 may be made of hard materials, such as plastic or the like, and the outer shell 10 may be made of flexible materials, such as silicone and the like.

Figure 4:
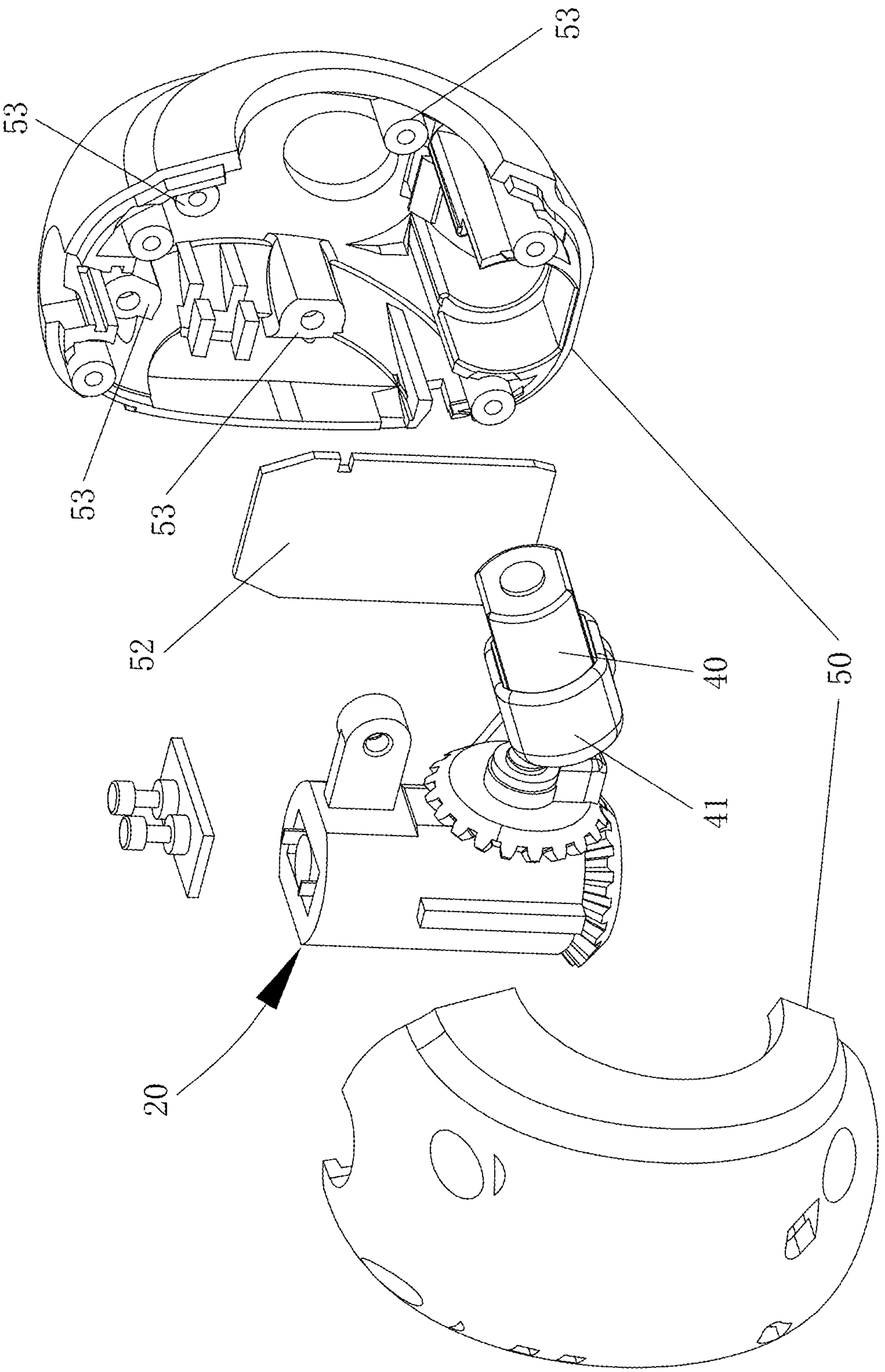
FIG. 4 is a further exploded view of the sexual stimulation device of FIG. 1, wherein an outer shell is removed.
Figure 5:
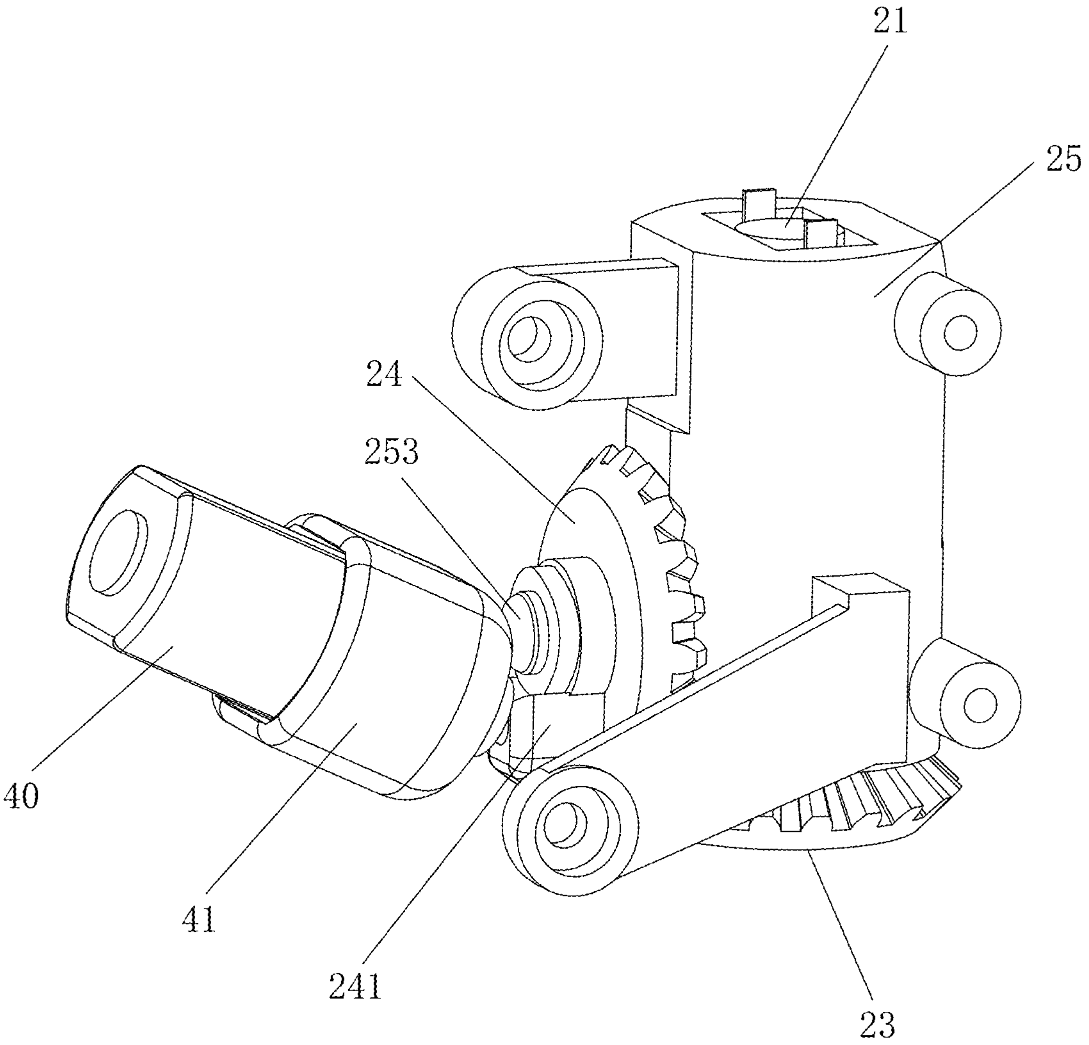
FIG. 5 is a schematic view of a driving mechanism of the sexual stimulation device of FIG. 1.
Figure 6:
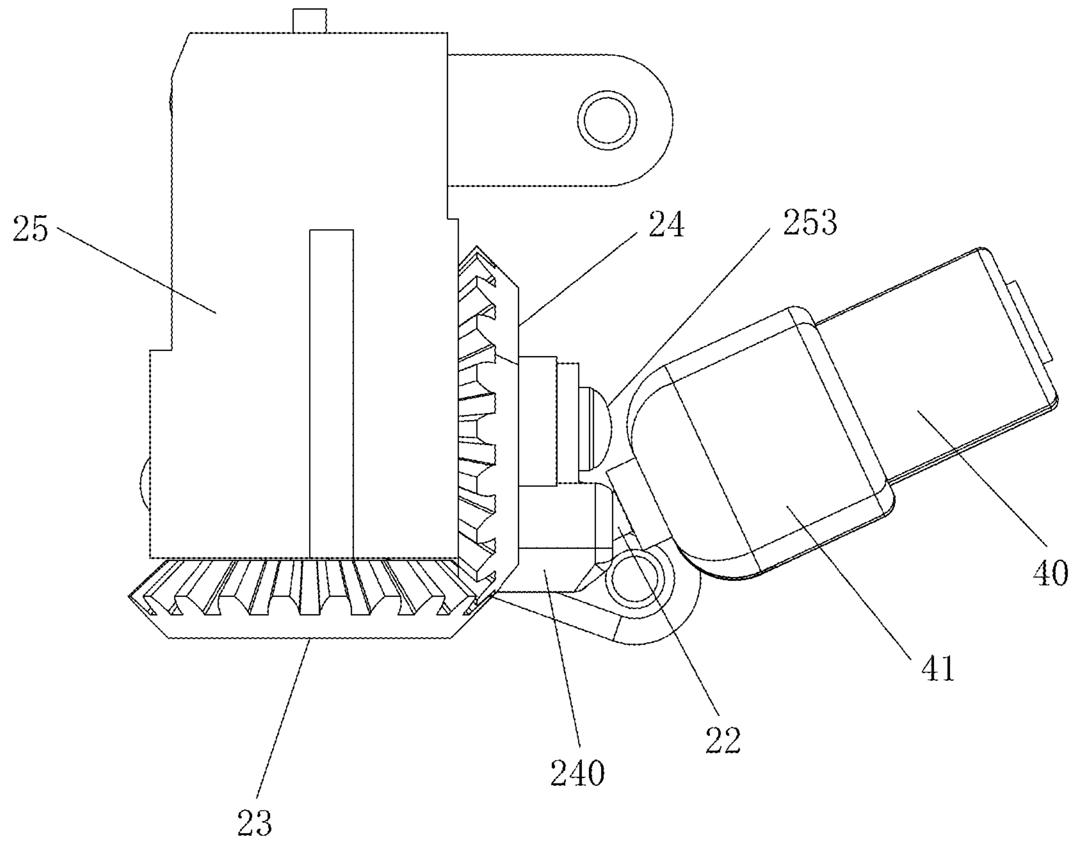
FIG. 6 is a side view of the driving mechanism of FIG. 5.

In this embodiment, a through hole 51 is formed at one side of the inner shell 50 for extending of the driving shaft 22 from the inner shell 50 into the massage member 11 to connect the mounting sleeve 41. Optionally, electronic components such as PCB 52, battery, and etc., may be arranged inside the inner shell 50 and connected to the driving source 21 electronically. As shown in FIG. 4, in this embodiment, the inner shell 50 is formed by two half shells, facilitating assembly of the driving mechanism 20, the electronic components into the inner shell 50.

Referring to FIG. 2*b* and FIGS. 5-7, a rotary axis L5 of the driving source 21 may be perpendicular to the rotary axis L1 of the massage member 11, so as to reduce the overall size of the sexual stimulation device 100. In this embodiment, the driving source 21 is a rotary motor, and a steering unit including a first bevel gear 23 and a second bevel gear 24 that mesh with each other is provided between the driving source 21 and the driving shaft 22. The first bevel gear 23 is connected to the driving source 21, and the second bevel gear 24 is connected to the driving shaft 22. Thus, a 90° change in the direction of torque transmission is achieved.

Figure 7:
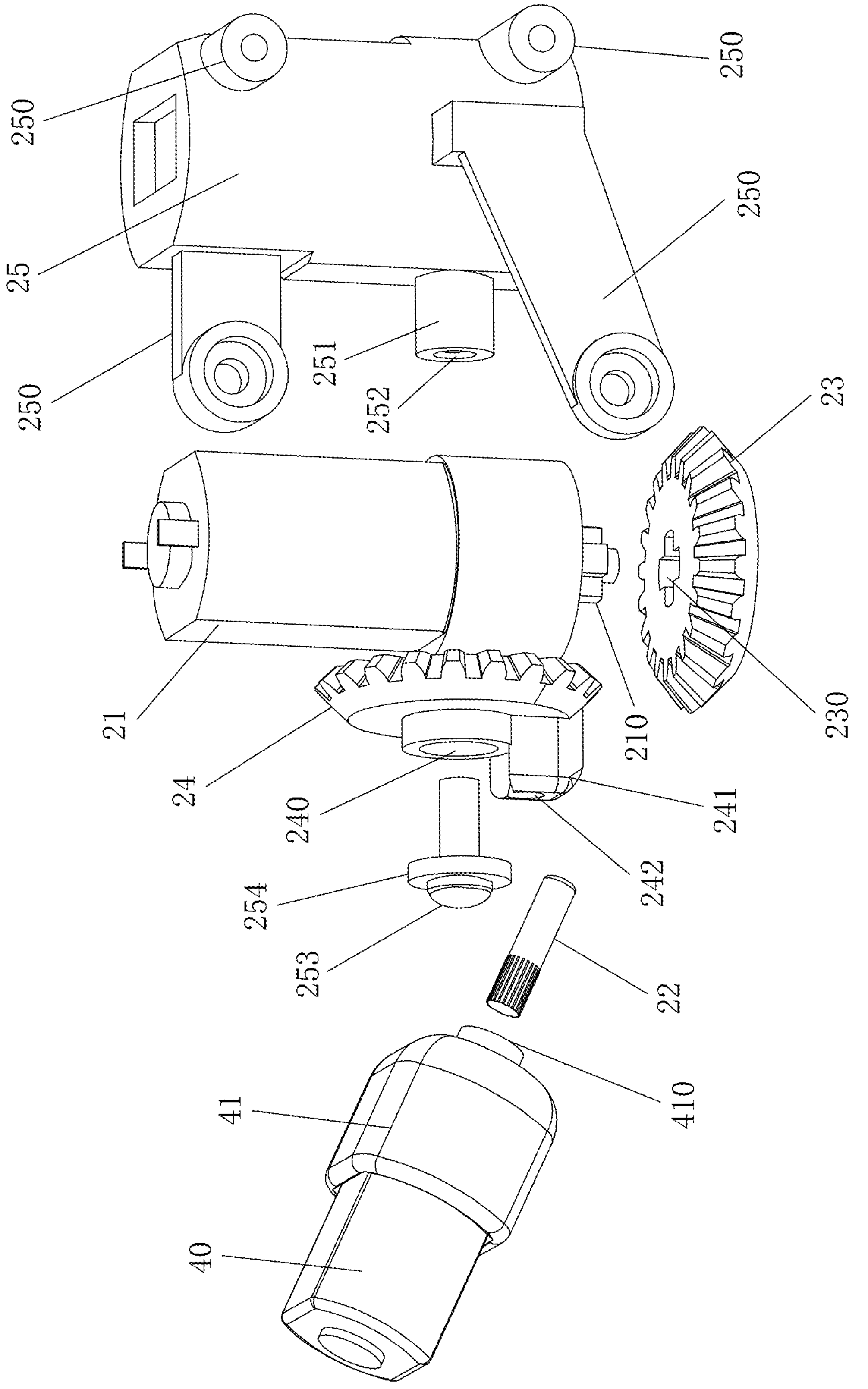
FIG. 7 is an exploded view of the driving mechanism of FIG. 5.

More specifically, the first bevel gear 23 is connected to an output shaft 210 of the driving source 21, so as to rotate along with the output shaft 210. For example, as shown in FIG. 7, the output shaft 210 of the driving source 21 may be configured with an external spline, and correspondingly, the first bevel gear 23 may be configured with an internal spline 230. By means of cooperation of the internal spline 230 and external spline, torque transmission and synchronous rotation of the output shaft 210 and the first bevel gear 23 can be achieved. It should be understood that, in other embodiments, the torque transmission and synchronous rotation of the output shaft 210 and the first bevel gear 23 may be achieved through other means, such as non-circular output shaft and corresponding non-circular hole.

In this embodiment, the driving mechanism 20 further includes a mounting frame 25 for installing the driving source 21 into the inner shell 50. The mounting frame 25 has an inner space for accommodating the driving source 21 therein. An outer wall of the mounting frame 25 is provided with one or multiple connecting portions 250. As shown in FIG. 7, the connecting portions 250 may be column-shaped or plate-shaped, which are not limited in this application. As shown in FIG. 4, an inner wall of the inner shell 50 is provided with one or multiple mounting seats 53. The connecting portions 250 are connected to the mounting seats 53 by fasteners, thereby fixing the mounting frame 25 and the driving source 21 into the inner shell 50.

Referring to FIG. 2*b* and FIGS. 5 to 7 again, a support column 251 is provided on the outer wall of the mounting frame 25, and the second bevel gear 24 is rotatably mounted around the support column 251 through a shaft hole 240 defined in its central portion, wherein a rotary axis of the second bevel gear 24 is collinear with the rotary axis L1. Preferably, the support column 251 is provided with a fixing hole 252 in a central portion thereof, and a fixing member 253, such as a screw, a pin, and etc., is supported on a distal end side of the second bevel gear 24 by a gasket 254 and fixedly engaged into the fixing hole 252 of the support column 251, for example, by threaded connection, so as to stably install the second bevel gear 24 onto the support column 251.

As shown in FIG. 7, in this embodiment, the second bevel gear 24 is provided with an eccentric block 241. The one end of the driving shaft 22 is inserted into the eccentric block 241, and the another end of the driving shaft 22 extends inclined relative to the rotary axis L1 towards the mounting sleeve 41. As shown in FIG. 2*b*, in this embodiment, the eccentric block 241 is provided with an inclined hole 242, and the one end of the driving shaft 22 is engaged into the inclined hole 242 and fixedly connected to the eccentric block 241 on the second bevel gear 24.

During use, the sexual stimulation device 100 is positioned onto the human body, specifically the male penis, through the position member 30 with the massage member 11 away from the human body and facing towards the outside. Thus, the massage member 11 may act on another human body, particularly on the clitoris, the breasts of the woman. The driving source 21 is started to make its output shaft 210 drive the driving shaft 22 revolve around the rotary axis L1 through the first bevel gear 23 and second bevel gear 24. Thereby, the mounting sleeve 41, as well as the massage member 11 connected mounting sleeve 41 and the vibration member 40 in the massage member 11, revolve around the rotary axis L1 along with the driving shaft 22, stimulating the clitoris or the breasts. At the same time, the vibration member 40 inside the massage member 11 makes it to vibrate, further stimulating the clitoris or the breasts.

It should be understood that the above embodiment is an exemplary embodiment of the present application, and those skilled in the art may modify them accordingly. For example, in other embodiments, the driving shaft 22 may be connected to the second bevel gear 24 by other means, and the second bevel gear 24 may be configured with other constructions. Furthermore, the driving shaft 22 may be connected to the massage member 11 directly, thereby omitting the mounting sleeve 41. Moreover, the output shaft 210 of the drive source 21 may be connected to the driving shaft 22 directly, thereby omitting the first bevel gear 23 and the second bevel gear 24.

Figure 8:
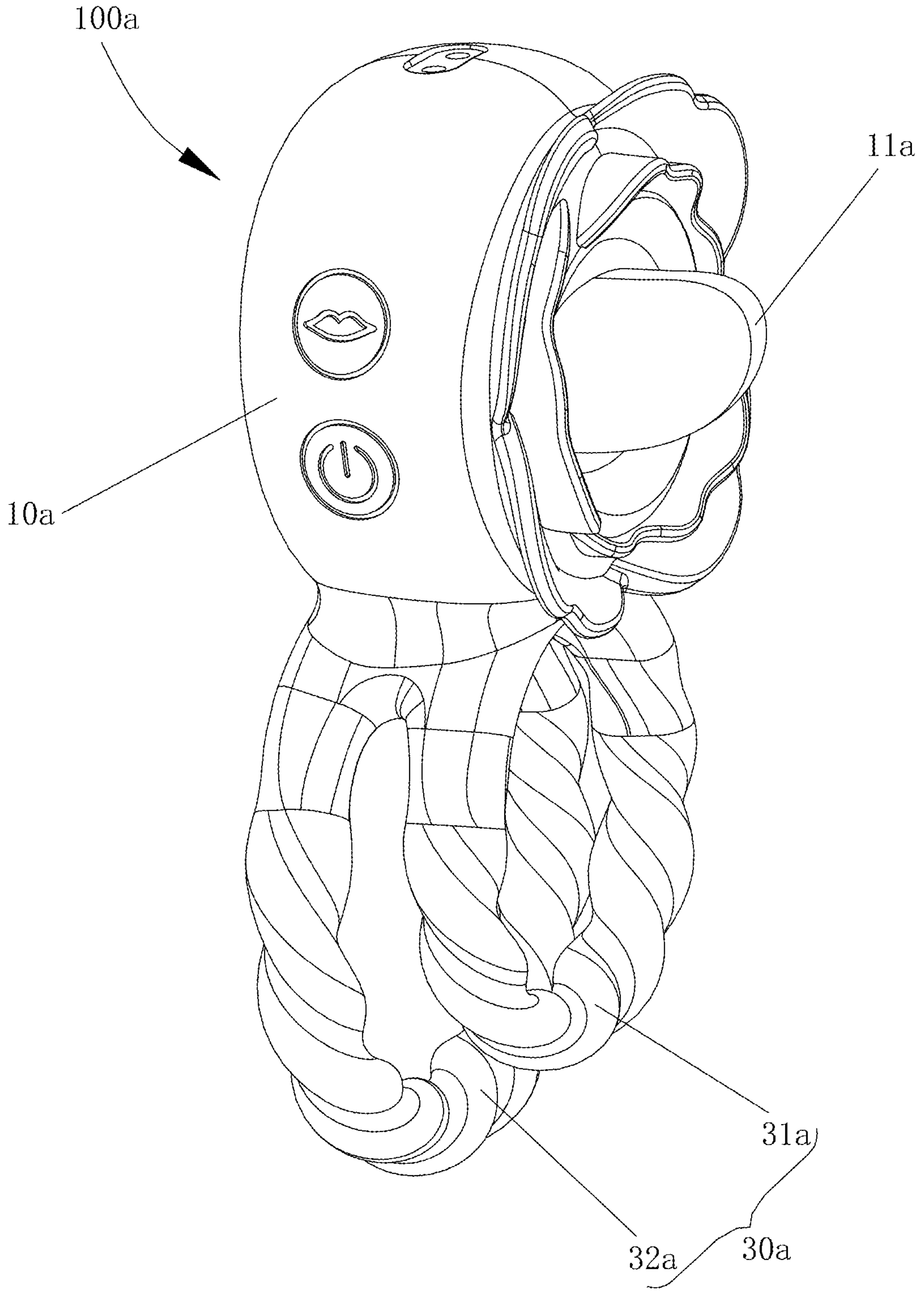
FIG. 8 is an isometric, assembled view of a sexual stimulation device according to a second embodiment of the present application.

Referring to FIG. 8, a sexual stimulation device according to a second embodiment of the present application is shown. The sexual stimulation device 100*a* includes an outer shell 10*a* configured with a massage member 11*a*, a driving mechanism mounted in the outer shell 10*a*, and a position member 30*a* provided on a circumferential wall of the outer shell 10*a*. The outer shell 10*a* and the driving mechanism are generally the same as those in the first embodiment, and therefore, will not be repeated here. In this embodiment, the position member 30*a* includes a first ring 31*a* and a second ring 32*a*, wherein outer surfaces of the first ring 31*a* and second ring 32*a* are configured with threads, which can more stably fix this device 100*a* on the human body.

Figure 9:
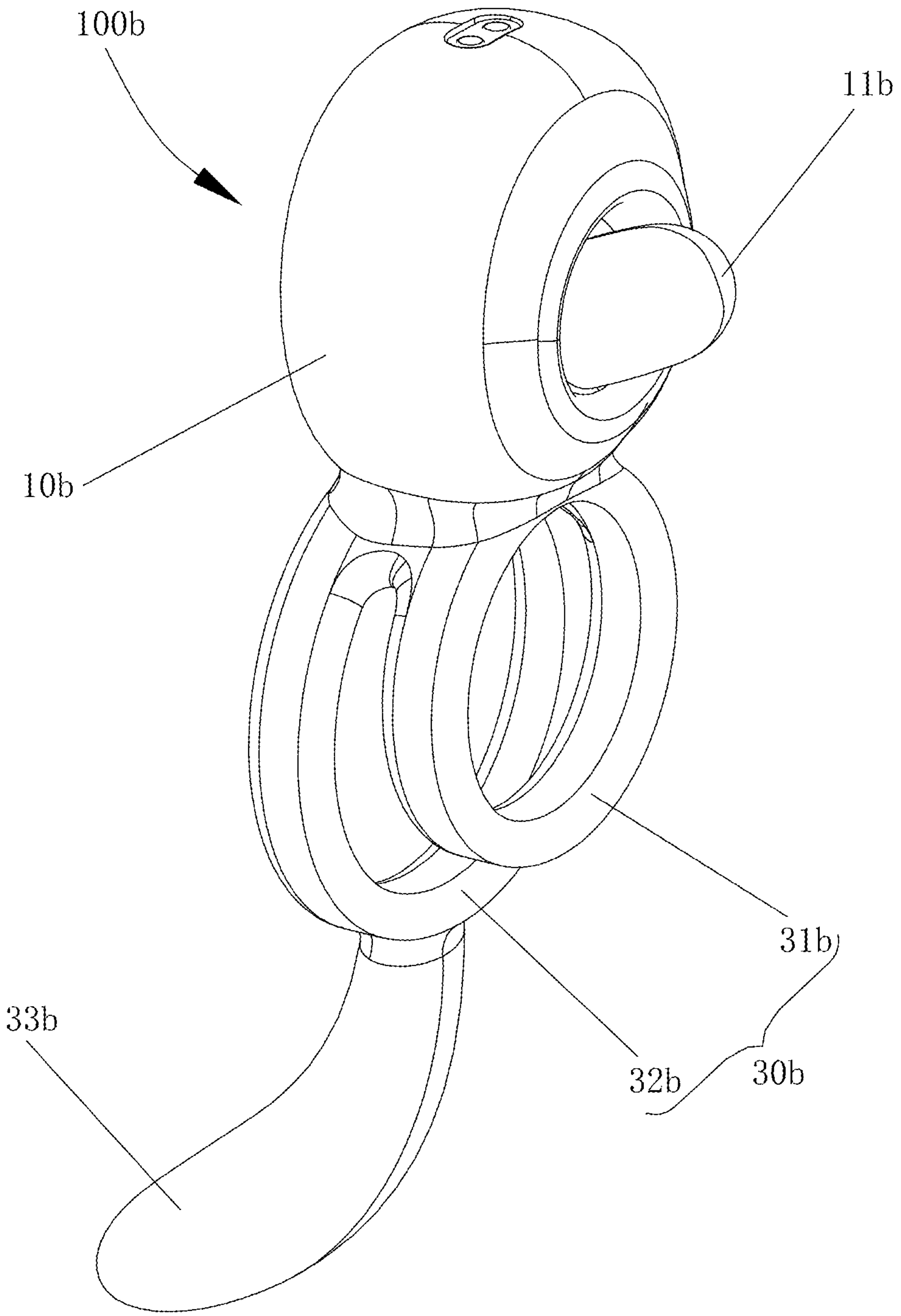
FIG. 9 is an isometric, assembled view of a sexual stimulation device according to a third embodiment of the present application.
Figure 10:
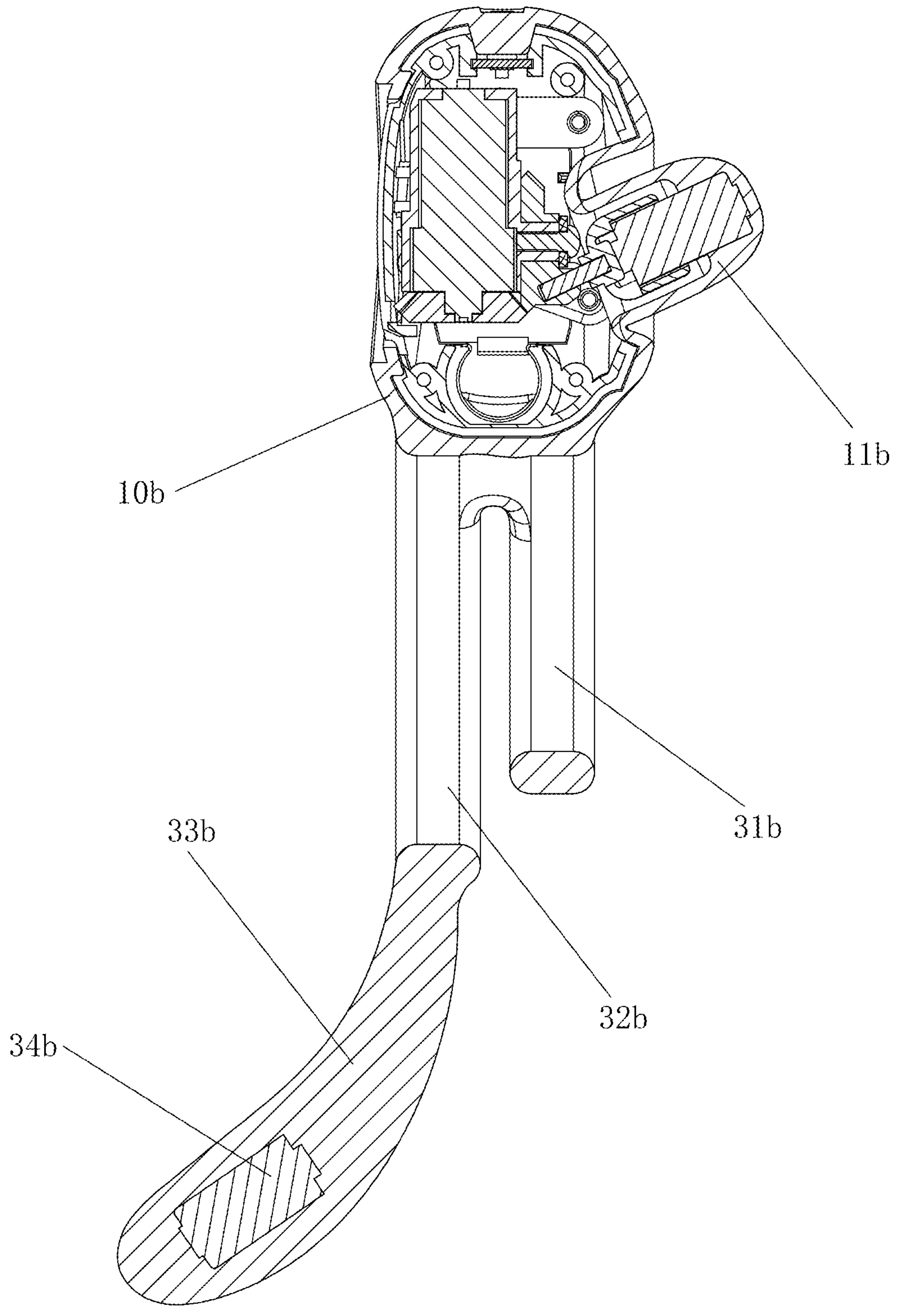
FIG. 10 is a cross sectional view of the sexual stimulation device of FIG. 9.

Referring to FIGS. 9-10, a sexual stimulation device according to a third embodiment of the present application is shown. The sexual stimulation device 100*b* includes an outer shell 10*b* configured with a massage member 11*b*, a driving mechanism mounted in the outer shell 10*b*, and a position member 30*b* provided on a circumferential wall of the outer shell 10*b*. In this embodiment, the position member 30*b* includes a first ring 31*b* and a second ring 32*b*, wherein a tail 33*b* extends outwardly from a bottom of the second ring 32*b* (i.e., a position of the second ring 32*b* opposite to a connecting position of the second ring 32*b* and the outer shell 10*b*).

When the sexual stimulation device 100*b* is assembled onto the male penis by the rings 31*b*, 32*b*, the tails 33*b* may extend downwards and backwards to a bottom of the scrotum, thereby this device 100*b* can stimulate two people simultaneously. Preferably, the tail 33*b* is made of flexible materials, such as silicone. Preferably, the tail 33*b* is integrally formed with the second ring 32*b* and extends curvedly from the second ring 32*b*. Preferably, a vibration member 34*b*, such as a vibration motor, is accommodated inside a distal end of the tail 33*b* for enhancing the stimulation to the scrotum.

Figure 11:
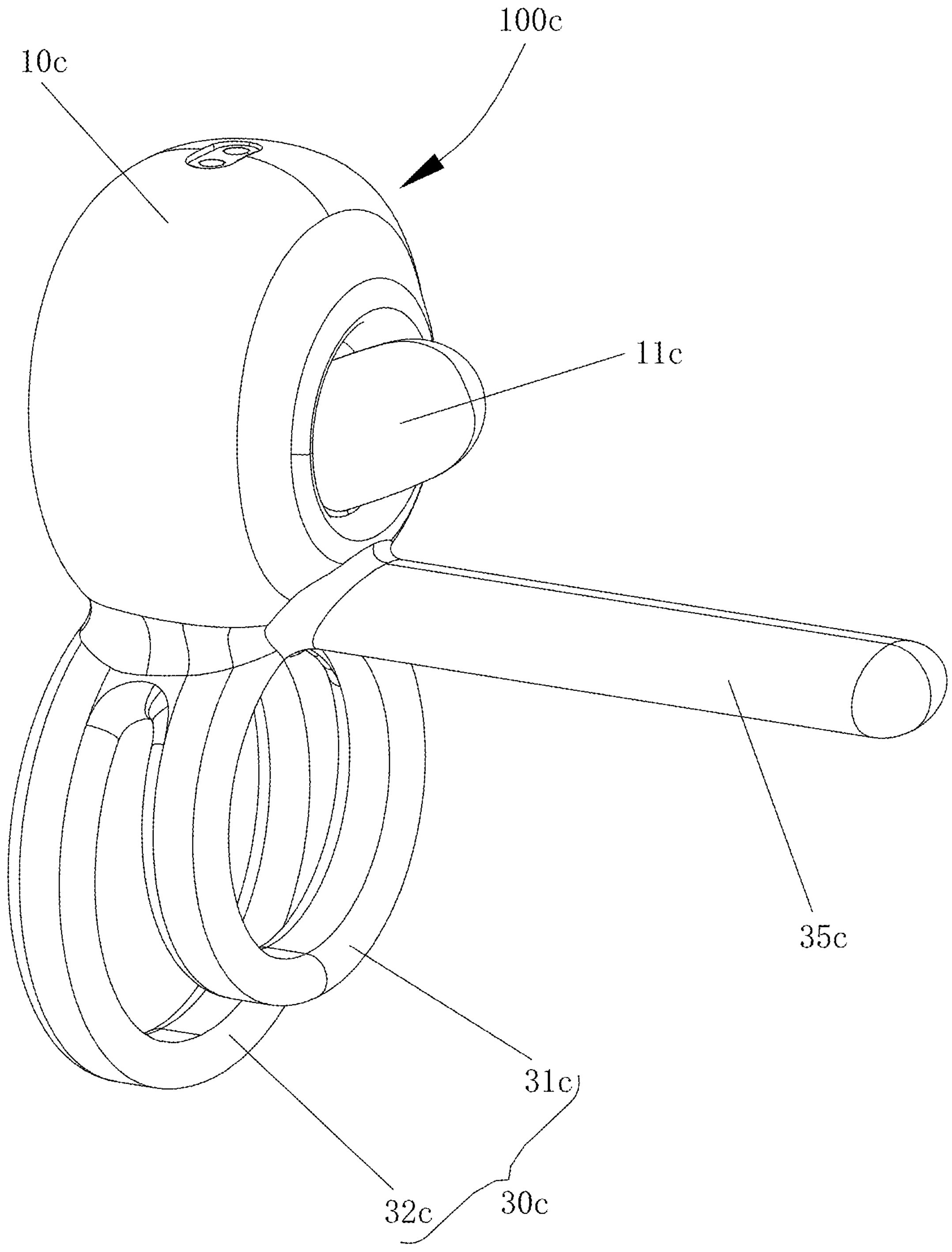
FIG. 11 is an isometric, assembled view of a sexual stimulation device according to a fourth embodiment of the present application.
Figure 12:
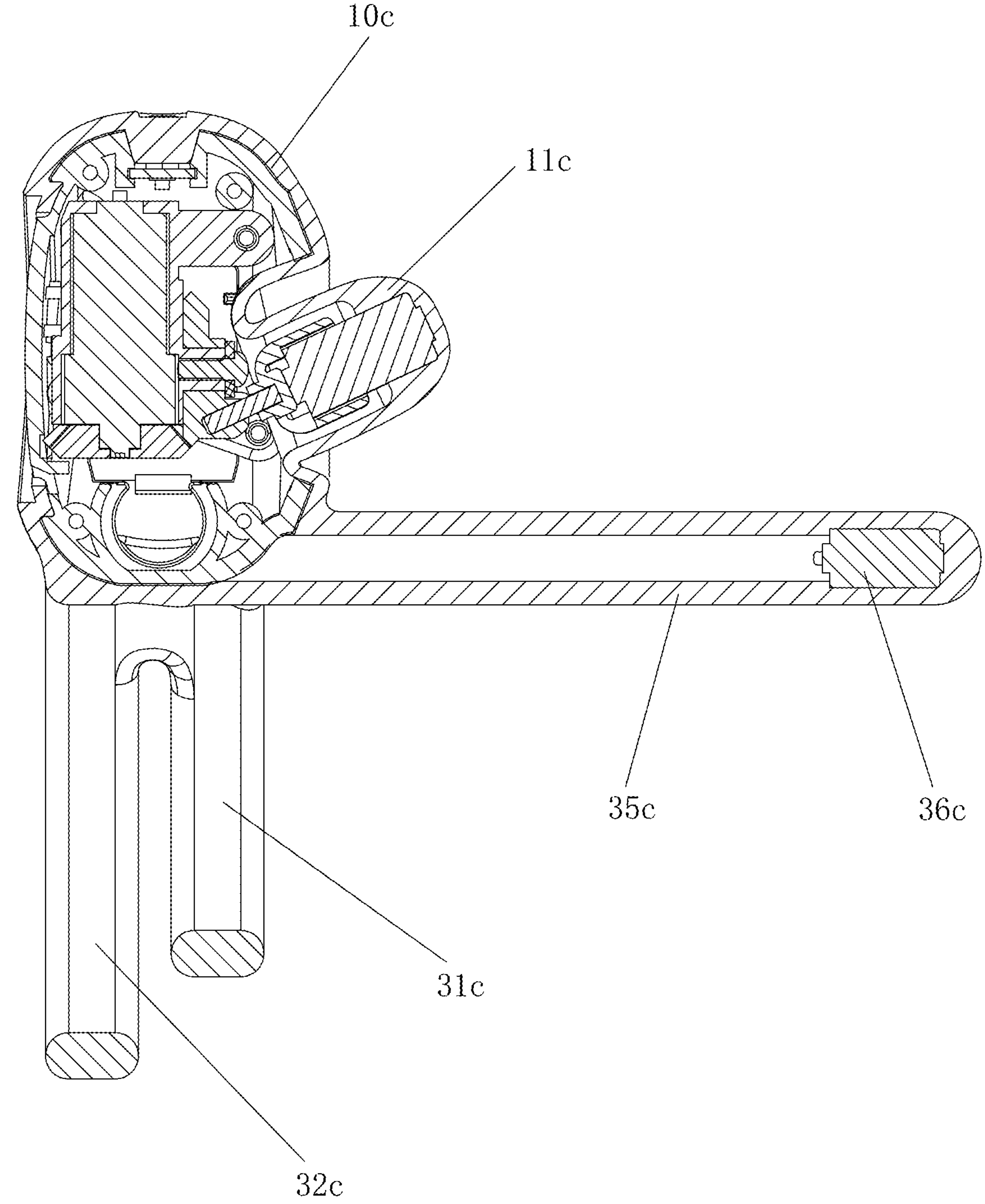
FIG. 12 is a cross sectional view of the sexual stimulation device of FIG. 11.

Referring to FIGS. 11-12, a sexual stimulation device according to a fourth embodiment of the present application is shown. The sexual stimulation device 100*c* includes an outer shell 10*c* configured with a massage member 11*c*, a driving mechanism mounted in the outer shell 10*c*, and a position member 30*c* provided on a circumferential wall of the outer shell 10*c*. In this embodiment, the position member 30*c* includes a first ring 31*c* and a second ring 32*c*, wherein an elongated rod 35*c* extends outwardly from a top of the first ring 31*c* (i.e., a connecting position of the first ring 31*c* and the outer wall 10*c*).

When the sexual stimulation device 100*c* is assembled onto the male penis by the rings 31*c*, 32*c*, the rod 35*c* may extend frontwards into the vagina or the rectum of another human body, further enhancing the stimulation effect. Preferably, the rod 35*c* is made of flexible materials and integrally formed with the first ring 31*c*. Preferably, the rod 35*c* extends along a direction generally parallel to the central axis of the first ring 31*c*. Preferably, a vibration member 36*c*, such as a vibration motor, is accommodated inside a distal end of the rod 35*c* for further enhancing the stimulation effect.

Figure 13:
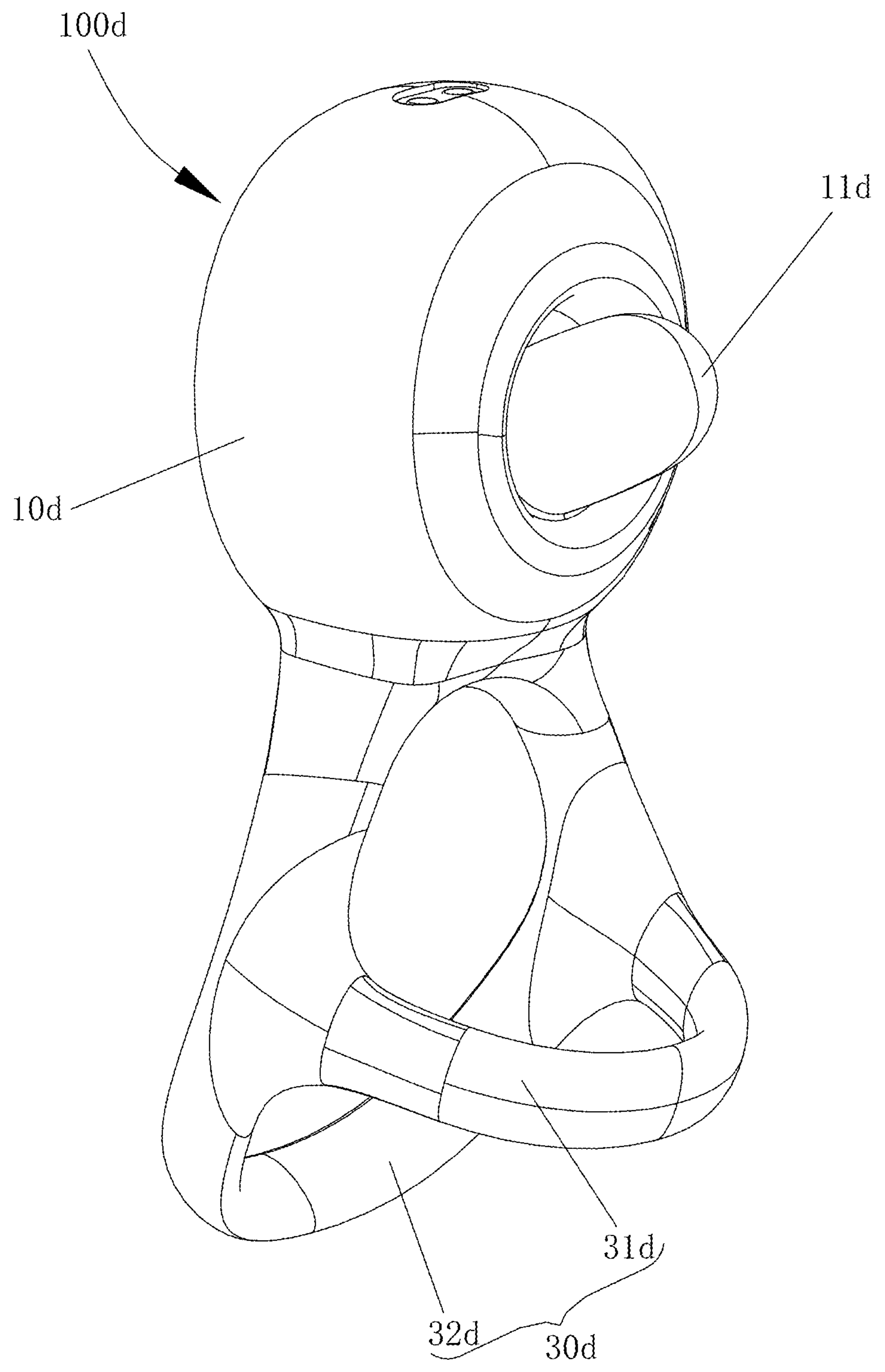
FIG. 13 is an isometric, assembled view of a sexual stimulation device according to a fifth embodiment of the present application.

Referring to FIG. 13, a sexual stimulation device according to a fifth embodiment of the present application is shown. The sexual stimulation device 100*d* of this embodiment includes an outer shell 10*d* configured with a massage member 11*d*, a driving mechanism mounted in the outer shell 10*d*, and a position member 30*d* provided on a circumferential wall of the outer shell 10*d*. In this embodiment, the position member 30*d* includes a first ring 31*d* and a second ring 32*d*, wherein the first ring 31*d* and the second ring 32*d* are connected to each other in an unparalleled manner, so that the position member 30*d* in whole may be considered as a triangular structure.

Specifically, a central axis of the second ring 32*d* may be generally parallel to the rotary axis of the massage member 11, while a central axis of the first ring 31*d* is angled with, preferably perpendicular to the rotary axis of the massage member 11. The second ring 32*d* is connected to a bottom of the outer shell 10*d* integrally, and the first ring 31*d* is approximately semi-circular and vertically connected to a middle portion of the second ring 32*d*.

It should be understood that, in other embodiments, the central axis of the first ring 31*d* and the central axis of the second ring 32*d* may be un-parallel to each other; and/or, the central axes of the first ring 31*d* and second ring 32*d* both may be un-parallel to the rotary axis.

Figure 14:
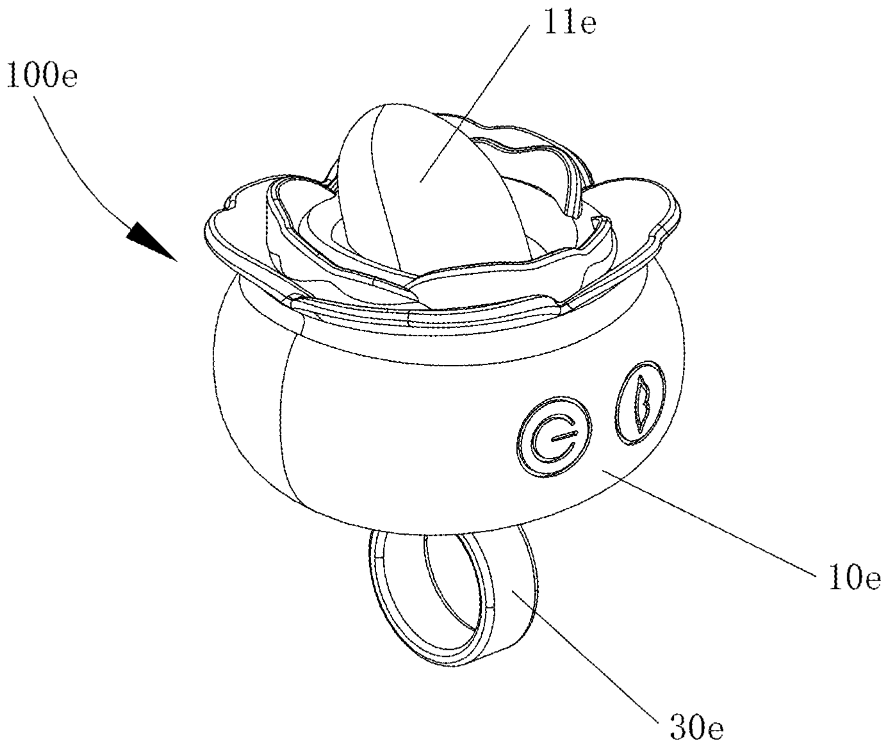
FIG. 14 is an isometric, assembled view of a sexual stimulation device according to a sixth embodiment of the present application.
Figure 15:
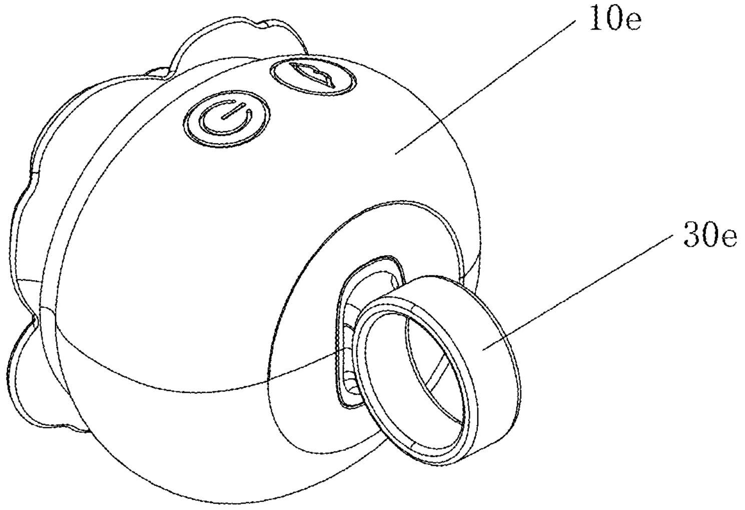
FIG. 15 shows the sexual stimulation device from another aspect.

Referring to FIGS. 14-15, a sexual stimulation device according to a sixth embodiment of the present application is shown. The sexual stimulation device 100*e* of this embodiment includes an outer shell 10*e* configured with a massage member 11*e*, a driving mechanism mounted in the outer shell 10*e*, and a position member 30*e* provided on the outer shell 10*d*. Differently from the previous embodiments, the position member 30*e* is configured with only one ring, and the ring is provided at an axial end of the outer wall 10*e*. That is, the position member 30*e* and the massage member 11*a* are provided at two opposite ends of the outer shell 11*e*, respectively.

It should be noted that the position member is configured to position the sexual stimulation device on a certain part, especially a column-shaped part, of the human body, and its structure, size, position, and etc. may be modified accordingly to the part on which the massage member to be positioned. Preferably, the position member includes several rings with different inner diameters, so as to be adaptable to different sizes of users. In addition, the ring of the position member is not limited to be a standard circular ring, it may be, for example, an elliptical ring, a square ring, an irregular ring, as long as it has a hole for positioning it onto the human body.

Finally, it should be noted that: the above merely describes preferred embodiments of the present application without intention to limit the scope of the present application. Any modifications, equivalent replacements, improvements, and etc. made by those skilled in the art within the spirit and principle of the present application should be within the scope of the present application.

What is claimed is:

1. A sexual stimulation device, comprising:

an outer shell being configured with a flexible massage member, the massage member having a central axis;

a driving mechanism mounted inside the outer shell and comprising a driving source and a driving shaft connected to the driving source in a transmission manner, the massage member being connected to the driving shaft to rotate along with the driving shaft, wherein a rotary axis of the massage member is inclined relative to the central axis of the massage member, a rotary axis of the driving source is angled with the rotary axis of the massage member; and a position member connected to the outer shell and comprising at least one ring configured for positioning the massage member onto a human body during use.

2. The sexual stimulation device according to claim 1, wherein the at least one ring is flexible.

3. The sexual stimulation device according to claim 1, wherein the at least one ring comprises a plurality of rings configured with different inner diameters.

4. The sexual stimulation device according to claim 1, wherein the at least one ring is configured for positioning the massage member onto a male penis of the human body during use, and the massage member is configured for stimulating a vulva of another human body.

5. The sexual stimulation device according to claim 4, further comprising a tail extending from the at least one ring for stimulating a scrotum of the human body, wherein a connecting position of the tail and the at least one ring and a connecting position of the outer shell and the at least one ring are opposite to each other.

6. The sexual stimulation device according to claim 5, wherein a vibration member is accommodated in a distal end of the tail.

7. The sexual stimulation device according to claim 4, further comprising an elongated rod extending from a connecting position of the at least one ring and the outer shell, wherein the elongated rod is configured to be inserted into a vagina or a rectum of the another human body.

8. The sexual stimulation device according to claim 7, wherein a vibration member is accommodated in a distal end of the elongated rod.

9. The sexual stimulation device according to claim 1, wherein the at least one ring and the massage member are provided at two opposite ends of the outer shell, respectively.

10. The sexual stimulation device according to claim 1, wherein the at least one ring is connected to a circumferential wall of the outer shell which surrounds the rotary axis, and a central axis of the at least one ring is substantially parallel to the rotary axis.

11. The sexual stimulation device according to claim 1, wherein the at least one ring comprises two rings, and central axes of the two rings are angled with each other.

12. The sexual stimulation device according to claim 1, wherein threads are provided on an outer surface of the at least one ring.

13. The sexual stimulation device according to claim 1, wherein a plurality of petal-shaped flanges are arranged around the massage member.

14. The sexual stimulation device according to claim 1, further comprising a vibration member mounted inside the massage member.

15. The sexual stimulation device according to claim 14, wherein a mounting sleeve is fixed into the massage member, the vibration member is partly accommodated in the mounting sleeve and partly supported by an inner wall of the massage member, and the driving shaft is fixedly connected to the mounting sleeve.

16. The sexual stimulation device according to claim 1, wherein a steering unit is connected between the driving source and the driving shaft.

17. The sexual stimulation device according to claim 16, wherein the steering unit comprising a first bevel gear and a second bevel gear that mesh with each other, the first bevel gear is connected to the driving source, and the driving shaft is connected to the second bevel gear is an eccentric manner.

18. The sexual stimulation device according to claim 1, wherein the outer shell, the massage member and the at least one ring are integrally formed as one piece.

19. A sexual stimulation device, comprising:

an outer shell being configured with a flexible massage member, the massage member having a central axis;

a driving mechanism mounted inside the outer shell and comprising a driving source and a driving shaft connected to the driving source in a transmission manner, the massage member being connected to the driving shaft to rotate along with the driving shaft, wherein a rotary axis of the massage member is inclined relative to the central axis of the massage member; and a position member connected to the outer shell and comprising a plurality of rings configured for positioning the massage member onto a human body during use, wherein the plurality of rings are configured with different inner diameters.

20. A sexual stimulation device, comprising:

an outer shell being configured with a flexible massage member, the massage member having a central axis;

a driving mechanism mounted inside the outer shell and comprising a driving source and a driving shaft connected to the driving source in a transmission manner, the massage member being connected to the driving shaft to rotate along with the driving shaft, wherein a rotary axis of the massage member is inclined relative to the central axis of the massage member; and a position member connected to the outer shell and comprising two rings configured for positioning the massage member onto a human body during use, wherein central axes of the two rings are angled with each other.

* * * * *